US012652396B2

(12) United States Patent
Jeon et al.

(10) Patent No.: US 12,652,396 B2
(45) Date of Patent: Jun. 9, 2026

(54) METHOD AND APPARATUS FOR VIDEO CODING USING MOTION VECTOR WITH COMPONENT-WISE ADAPTIVE SPATIAL RESOLUTION

(71) Applicants: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

(72) Inventors: Byeung Woo Jeon, Seongnam-si (KR); Bum Yoon Kim, Yongin-si (KR); Yu Jin Lee, Suwon-si (KR); Seung Wook Park, Yongin-si (KR)

(73) Assignees: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 132 days.

(21) Appl. No.: 18/368,731

(22) Filed: Sep. 15, 2023

(65) Prior Publication Data

US 2024/0007649 A1 Jan. 4, 2024

Related U.S. Application Data

(63) Continuation of application No. PCT/KR2022/003786, filed on Mar. 17, 2022.

(30) Foreign Application Priority Data

| Mar. 19, 2021 | (KR) | 10-2021-0035973 |
| Mar. 16, 2022 | (KR) | 10-2022-0032805 |

(51) Int. Cl.
| *H04N 19/154* | (2014.01) |
| *H04N 19/176* | (2014.01) |
(Continued)

(52) U.S. Cl.
CPC ......... *H04N 19/154* (2014.11); *H04N 19/176* (2014.11); *H04N 19/46* (2014.11);
(Continued)

(58) Field of Classification Search
None
See application file for complete search history.

(56) References Cited

U.S. PATENT DOCUMENTS

| 11,025,923 | B2 * | 6/2021 | Li | H04N 19/154 |
| 11,317,088 | B2 * | 4/2022 | Huang | H04N 19/136 |
(Continued)

FOREIGN PATENT DOCUMENTS

| CN | 105324999 | B | * | 1/2021 | H04N 19/46 |
| CN | 116567210 | A | * | 8/2023 | H04N 19/105 |
(Continued)

OTHER PUBLICATIONS

International Search Report and Written Opinion cited in corresponding international app No. PCT/KR2022/003786; Jun. 22, 2022; 9 pp.

*Primary Examiner* — Mohammed Jebari
(74) *Attorney, Agent, or Firm* — Lempia Summerfield Katz LLC

(57) ABSTRACT

A video coding method and apparatus adaptively determine spatial resolution for a horizontal component and a vertical component of a motion vector or block vector indicating a position of a reference block when performing inter prediction or intra block copy (IBC) of a current block. The video coding method and apparatus separately determine each spatial resolution for a plurality of motion vectors.

11 Claims, 10 Drawing Sheets

(51) Int. Cl.

| | |
|---|---|
| *H04N 19/46* | (2014.01) |
| *H04N 19/513* | (2014.01) |
| *H04N 19/523* | (2014.01) |
| *H04N 19/53* | (2014.01) |
| *H04N 19/70* | (2014.01) |

(52) U.S. Cl.
CPC ......... *H04N 19/513* (2014.11); *H04N 19/523* (2014.11); *H04N 19/53* (2014.11); *H04N 19/70* (2014.11)

(56) References Cited

U.S. PATENT DOCUMENTS

| | | | |
|---|---|---|---|
| 11,743,452 B2 | 8/2023 | Lee et al. | |
| 2015/0264348 A1* | 9/2015 | Zou ...................... | H04N 19/593 375/240.02 |
| 2016/0100189 A1* | 4/2016 | Pang ...................... | H04N 19/44 375/240.13 |

| | | | |
|---|---|---|---|
| 2017/0302936 A1* | 10/2017 | Li ......................... | H04N 19/503 |
| 2018/0199052 A1* | 7/2018 | He ......................... | H04N 19/52 |
| 2019/0089975 A1 | 3/2019 | Liu et al. | |
| 2020/0413078 A1* | 12/2020 | Li ......................... | H04N 19/176 |
| 2021/0297658 A1 | 9/2021 | Lee et al. | |
| 2022/0232221 A1 | 7/2022 | Lee et al. | |
| 2022/0286689 A1 | 9/2022 | Nam et al. | |
| 2022/0321894 A1* | 10/2022 | Lee ...................... | H04N 19/159 |
| 2022/0360813 A1 | 11/2022 | Le Leannec et al. | |
| 2023/0059366 A1* | 2/2023 | Bross ................... | H04N 19/105 |

FOREIGN PATENT DOCUMENTS

| | | | | |
|---|---|---|---|---|
| CN | 116965031 A | * | 10/2023 | ........... H04N 19/105 |
| KR | 20200026758 A | | 3/2020 | |
| KR | 20200145761 A | | 12/2020 | |
| WO | 2020254459 A1 | | 12/2020 | |
| WO | 2021025451 A1 | | 2/2021 | |

* cited by examiner

• Position of pixel

Motion vector

One pixel interval $(0, -\frac{2}{\sqrt{3}})$ $(-1, -\frac{1}{\sqrt{3}})$     $(1, -\frac{1}{\sqrt{3}})$ $(-1, \frac{1}{\sqrt{3}})$     $(1, \frac{1}{\sqrt{3}})$ $(0, \frac{2}{\sqrt{3}})$ (x, y) Value of motion vector

METHOD AND APPARATUS FOR VIDEO CODING USING MOTION VECTOR WITH COMPONENT-WISE ADAPTIVE SPATIAL RESOLUTION

CROSS-REFERENCE TO RELATED APPLICATIONS

This application is a Continuation of International Application No. PCT/KR2022/003786 filed on Mar. 17, 2022, which claims priority to Korean Patent Application No. 10-2021-0035973 filed on Mar. 19, 2021, and Korean Patent Application No. 10-2022-0032805 filed on Mar. 16, 2022, the entire disclosures of each of which are incorporated herein by reference.

TECHNICAL FIELD

The present disclosure relates to a video coding method and apparatus using a motion vector having adaptive spatial resolution for each component.

BACKGROUND

The statements in this section merely provide background information related to the present disclosure and do not necessarily constitute prior art.

Because video data has a large amount of data compared to audio or still image data, a lot of hardware resources, including memory, are typically needed to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, as the image size, resolution, and frame rate of video data gradually increase, the amount of data to be encoded also increases. Accordingly, a new compression technique providing higher coding efficiency and an improved image enhancement effect than existing compression techniques is desired.

When a block most similar to a current block is searched for and determined as a predictor and coding is performed, the encoder determines the block most similar to the current block as a reference block using a search process. Thereafter, the encoder transfers position information of the reference block to the decoder.

Prediction modes using pixel information of a reference block include inter prediction and intra block copy (IBC). In the inter prediction, the reference block exists in a picture different from that of the current block/On the other hand, in the IBC, the reference block exists in the same picture as that of the current block. Information indicating a position of the reference block in the inter prediction is referred to as a motion vector (MV), and information indicating the position of the reference block in the IBC is referred to as a block vector (BV). In the following description, for convenience, the term the motion vector is regarded as including a block vector.

When the encoder transmits motion vector information of the current block to the decoder, the encoder may divide the motion vector into a motion vector predictor (MVP) and a motion vector difference (MVD), and may transmit these (i.e., MV=MVP+MVD), instead of transmitting the motion vector itself. The encoder may form a candidate list using motion vectors used by blocks around the current block and/or previously used motion vectors, and then determine one of the motion vectors as the motion vector predictor. Therefore, the encoder transmits an index indicating a position in the candidate list instead of transmitting the motion vector predictor itself, thereby indicating the motion vector predictor using this index. On the other hand, the encoder transmits the motion vector difference itself, but may use spatial resolution of the motion vector to reduce a transmission overhead or perform precise motion vector transmission. In other words, spatial resolution of the difference of the motion vector may mean the spatial resolution of the motion vector.

Adaptive motion vector resolution (AMVR) is a technology in which a transmitted motion vector has various spatial resolution values. In the AMVR, spatial resolution of the motion vector may be selected, but there is a limitation that spatial resolution values of a horizontal component and a vertical component cannot be selected to be different from each other. For example, when the AMVR is applied to a motion vector having greatly different values of components, such as a horizontal component value of −2 and a vertical component value of −32, a transmission overhead increases in a case in which the resolution of the component having a smaller value is used as a reference, and the component value may be lost depending on a calculation such as rounding in a case in which the resolution of the component having a greater value is used as a reference. Further, when a plurality of motion vectors are transmitted, there is a disadvantage in that all the motion vectors should share one spatial resolution.

SUMMARY

In order to overcome the above problems and improve coding efficiency, embodiments of the present disclosure provide a method of effectively coding the spatial resolution of the motion vector.

Embodiments of the present disclosure provide a video coding method and an apparatus for adaptively determining spatial resolution for a horizontal component and a vertical component of a motion vector or block vector indicating a position of a reference block when performing inter prediction or intra block copy (IBC) of a current block. The video coding method and apparatus separately determine each spatial resolution for a plurality of motion vectors.

The technical problems to be solved by the present disclosure are not limited to the aforementioned problems. Other technical problems not mentioned herein should be clearly understood from the following description by those having ordinary skill in the art to which the present disclosure pertains.

At least one aspect of the present disclosure provides a method of determining spatial resolution values of a horizontal component and a vertical component with respect to a difference of a motion vector of a current block. The method may be performed by a video decoding apparatus. The method comprises decoding a same resolution flag from a bitstream, wherein the same resolution flag indicates whether the spatial resolution values of the horizontal component and the vertical component are the same. The method also comprises checking the same resolution flag. When the same resolution flag is false, the method also comprises: decoding one or more of a horizontal component AMVR flag, a horizontal component precision index, a vertical component AMVR flag, and a vertical component precision index from the bitstream, wherein the horizontal component AMVR flag and the vertical component AMVR flag indicate whether or not adaptive spatial resolution is applied to each component, and the horizontal component precision index and the vertical component precision index indicate one of preset spatial resolution values; and determining the spatial resolution values of the horizontal component and the vertical component to be different from each other based on the one or more of the horizontal component AMVR flag, the horizontal component precision index, the vertical component AMVR flag, and the vertical component precision index.

Another aspect of the present disclosure provides a method of determining spatial resolution values of a horizontal component and a vertical component with respect to a difference of a motion vector of a current block. The method may be performed by a video decoding apparatus. The method comprises decoding an AMVR flag from a bitstream, wherein the AMVR flag indicates whether or not adaptive spatial resolution is applied to the horizontal component and the vertical component. The method also comprises checking the AMVR flag. When the AMVR flag is true, the method also comprises decoding a horizontal component precision index and a vertical component precision index from the bitstream when the AMVR flag is true, wherein the horizontal component precision index and the vertical component precision index indicate one of preset spatial resolution values, and determining the spatial resolution values of the horizontal component and the vertical component on the basis of the horizontal component precision index and the vertical component precision index.

Yet another aspect of the present disclosure provides a method of determining spatial resolution values of a horizontal component and a vertical component with respect to a difference of a motion vector of a current block. The method may be performed by a video encoding apparatus. The method comprises acquiring a same resolution flag from a high level, wherein the same resolution flag indicates whether the spatial resolution values of the horizontal component and the vertical component are equal to each other. The method also comprises checking the same resolution flag. When the same resolution flag is false, the method also comprises: acquiring one or more of a horizontal component AMVR flag, a horizontal component precision index, a vertical component AMVR flag, and a vertical component precision index from the high level when the same resolution flag is false, wherein the horizontal component AMVR flag and the vertical component AMVR flag indicate whether or not adaptive spatial resolution is applied to each component, and the horizontal component precision index and the vertical component precision index indicate one of preset spatial resolution values; and determining the spatial resolution values of the horizontal component and the vertical component to be different from each other based on the one or more of the horizontal component AMVR flag, the horizontal component precision index, the vertical component AMVR flag, and the vertical component precision index.

As described above, embodiments of the present disclosure provide a video coding method and an apparatus for adaptively determining spatial resolution for a horizontal component and a vertical component of a motion vector or block vector indicating a position of a reference block when performing inter prediction or intra block copy (IBC) of a current block. The video coding method and apparatus separately determine each spatial resolution for a plurality of motion vectors to improve the coding efficiency.

BRIEF DESCRIPTION OF THE DRAWINGS

The above and other objects, features and advantages of the present disclosure should be more apparent from the following detailed description taken in conjunction with the accompanying drawings, in which.

DETAILED DESCRIPTION

Figure 1:
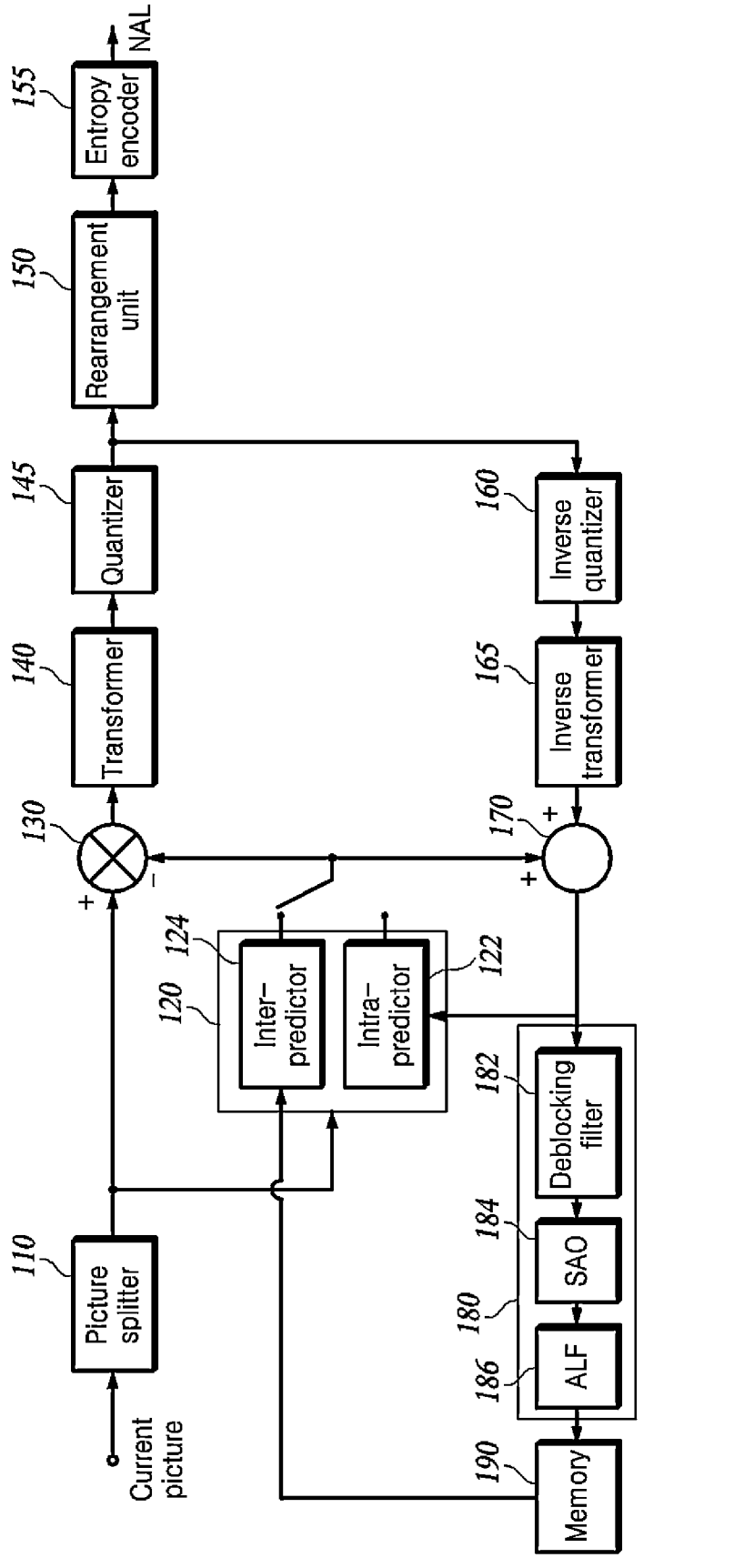
FIG. 1 is a block diagram of a video encoding apparatus, according to an embodiment of the present disclosure.

Hereinafter, embodiments of the present disclosure are described in detail with reference to the accompanying illustrative drawings. In the following description, like reference numerals designate like elements, although the elements may be shown in different drawings. Further, in the following description of some embodiments, detailed descriptions of related known components and functions, when considered to obscure the subject of the present disclosure, may be omitted for the purpose of clarity and for brevity.

When a component, device, element, or the like of the present disclosure is described as having a purpose or performing an operation, function, or the like, the component, device, or element should be considered herein as being "configured to" meet that purpose or perform that operation or function.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may be implemented to execute the function of the software corresponding to each component.

One video is constituted by one or more sequences including a plurality of pictures. Each picture is split into a plurality of areas, and encoding is performed for each area. For example, one picture is split into one or more tiles and/or slices. One or more tiles may be defined as a tile group. Each tile and/or slice is split into one or more coding tree units (CTUs). Each CTU is split into one or more coding units (CUs) by a tree structure. Information applied to each CU is encoded as a syntax of the CU and information commonly applied to the CUs included in one CTU is encoded as the syntax of the CTU. Information commonly applied to all blocks in one slice is encoded as the syntax of a slice header, and information applied to all blocks constituting one or more pictures is encoded to a picture parameter set (PPS) or a picture header. Information that the plurality of pictures commonly refers to is encoded to a sequence parameter set (SPS). In addition, information that one or more SPS commonly refer to is encoded to a video parameter set (VPS). Information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of CTUs having a predetermined size and then recursively splits the CTU by using a tree structure. A leaf node in the tree structure becomes the CU, which is a basic unit of encoding.

The tree structure may be a quadtree (QT) in which a higher node (or a parent node) is split into four lower nodes (or child nodes) having the same size. As another example, the tree structure may be a binarytree (BT) in which the higher node is split into two lower nodes. As yet another example, the tree structure may be a ternarytree (TT) in which the higher node is split into three lower nodes at a ratio of 1:2:1. As still another example, the tree structure may be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. A BTTT may be added to the tree structures to be referred to as a multiple-type tree (MTT).

Figure 2:
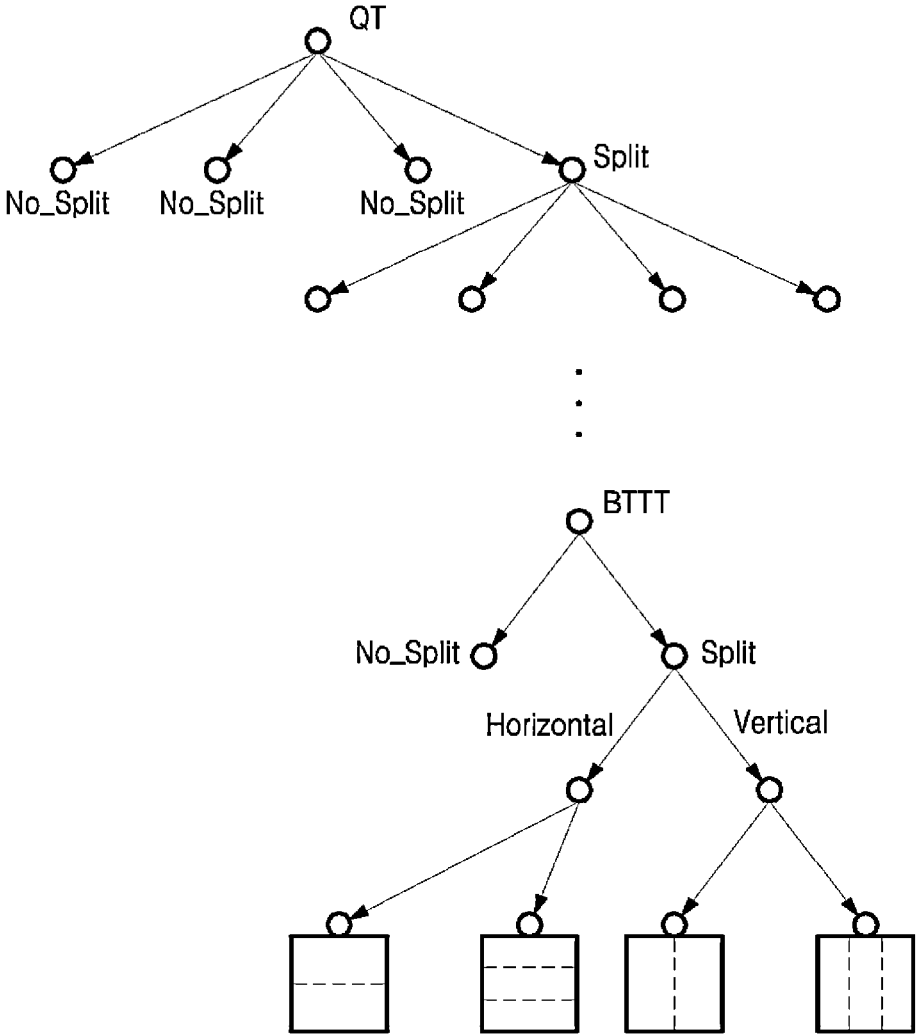
FIG. 2 illustrates a method for partitioning a block using a quadtree plus binarytree ternarytree (QTBTTT) structure, according to an embodiment of the present disclosure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, e.g., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, e.g., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. A type in which the block of the corresponding node is split into two blocks of a form of being asymmetrical to each other may be additionally present. The asymmetrical form may include a form in which the block of the corresponding node is split into two rectangular blocks having a size ratio of 1:3 and/or may include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may be a rectangular shape or a square shape.

The predictor 120 predicts the current block to generate a prediction block. The predictor 120 includes an intra predictor 122 and an inter predictor 124.

In general, each of the current blocks in the picture may be predictively coded. The prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
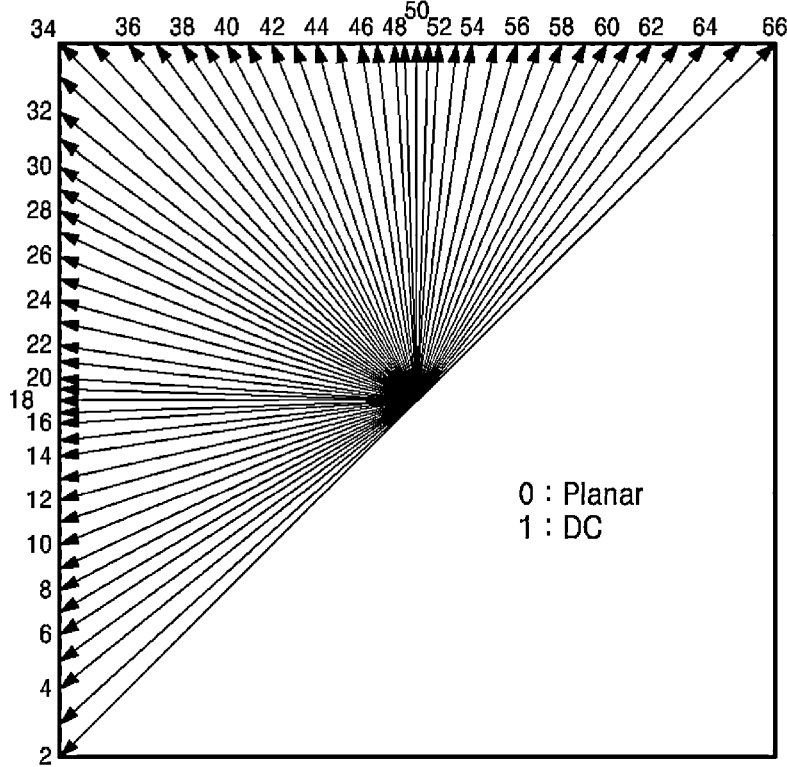
FIGS. 3A and 3B illustrate a plurality of intra prediction modes including wide-angle intra prediction modes, according to an embodiment of the present disclosure.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode. The plurality of intra prediction modes may also include 65 directional modes. A neighboring pixel and an arithmetic equation to be used are defined differently according to each prediction mode.

Figure 3B:
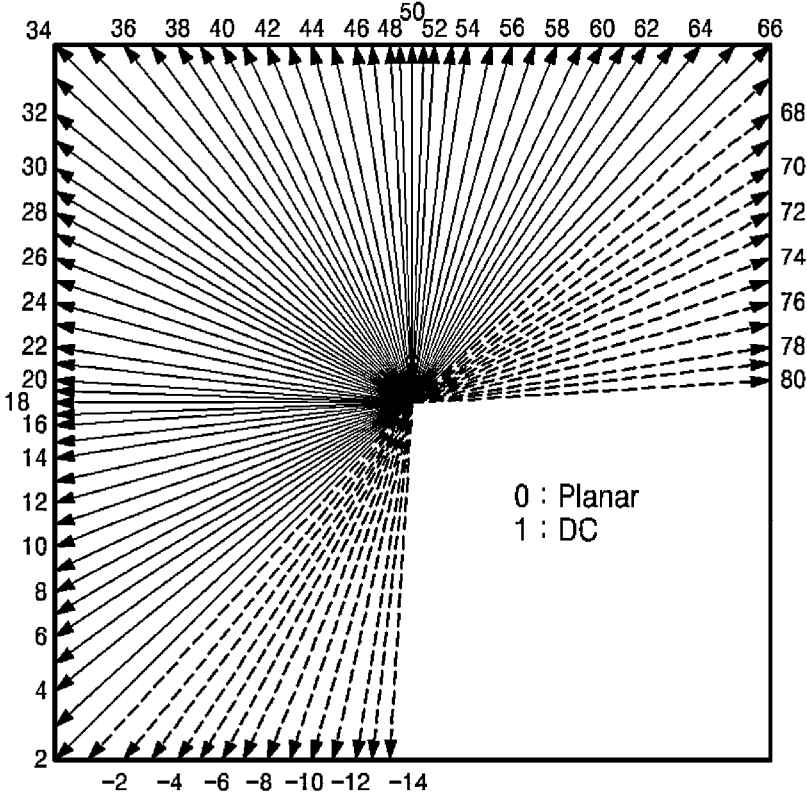

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation may be performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block may be generated by averaging or weighted-averaging the first reference block and the second reference block. Motion information including information on two reference pictures used for predicting the current block and information on two motion vectors is delivered to the entropy encoder 155. Reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
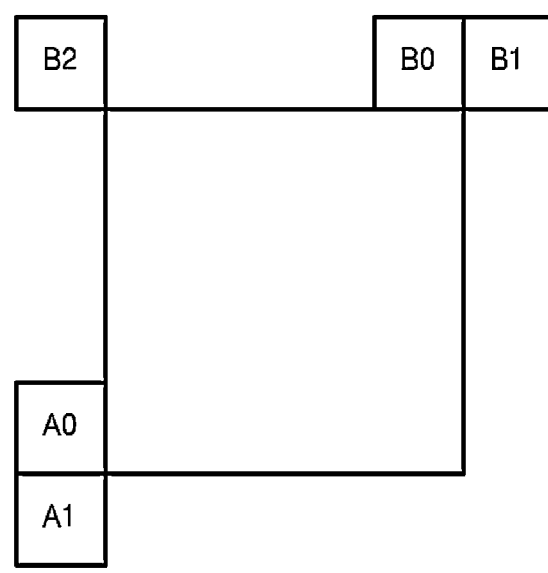
FIG. 4 illustrates neighboring blocks of a current block that may be used with embodiments of the present disclosure.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (which may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector may be added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (which may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector may be added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

The motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit. In another embodiment, the transformer 140 may split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. The transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. As another example, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

The transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter, and outputs the quantized transform coefficients to the entropy encoder 155. In another embodiment, the quantizer 145 may immediately quantize the related residual block without the transform for any block or frame. In an embodiment, the quantizer 145 may apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may be used instead of the zig-zag scan. In an embodiment, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block in the same manner as the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block may be used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the restored pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered by the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
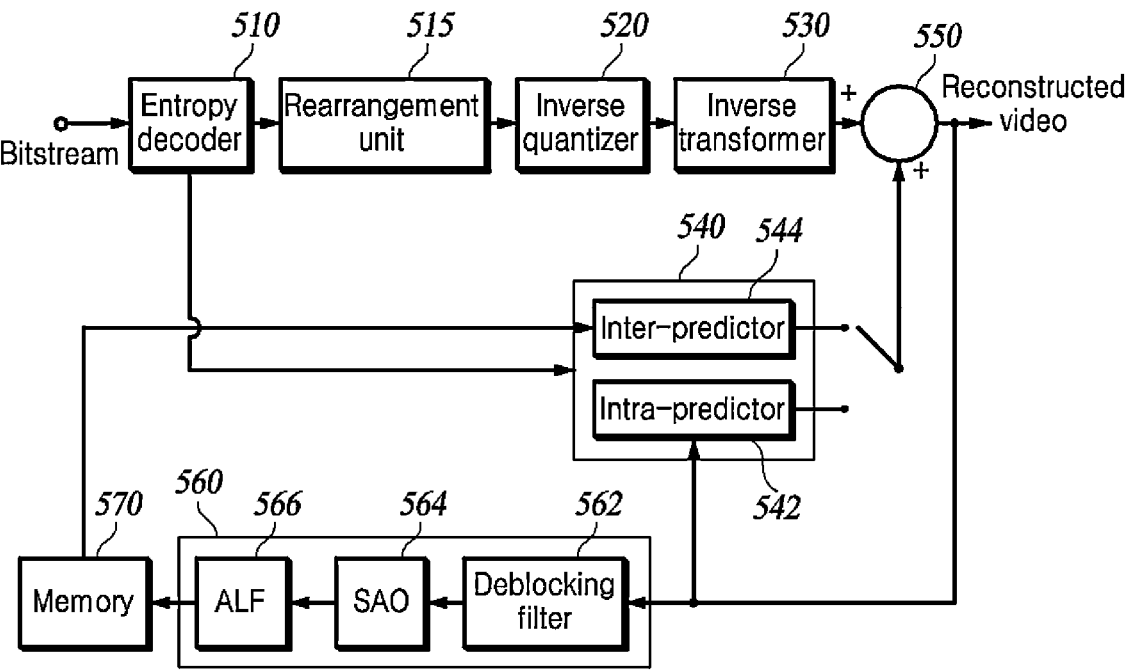
FIG. 5 is a block diagram of a video decoding apparatus, according to an embodiment of the present disclosure.

FIG. 5 is a functional block diagram of a video decoding apparatus that may implement the technologies of the present disclosure, according to an embodiment. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may be implemented to execute the function of the software corresponding to each component.

The entropy decoder 510 extracts information related to block splitting by decoding the bitstream generated by the video encoding apparatus to determine a current block to be decoded. The entropy decoder 510 also extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or, on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 may be activated when the prediction type of the current block is the intra prediction, and the inter predictor 544 may be activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transformer 530 and the prediction block output from the inter predictor 544 or the intra predictor 542. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate differences between the restored pixels and original pixels, which occur due to lossy coding. The filter coefficients of the ALF are determined by using information on filter coefficients decoded from the bitstream.

The restored block filtered by the deblocking filter 562, the SAO filter 564, and the ALF 566 is stored in the memory 570. When all blocks in one picture are restored, the restored picture may be used as a reference picture for inter predicting a block within a picture to be encoded afterwards.

The present disclosure in some embodiments relates to encoding and decoding video images as described above. More specifically, embodiments of the present disclosure provide a video coding method and an apparatus for adaptively determining spatial resolution for a horizontal component and a vertical component of a motion vector or block vector indicating a position of a reference block when performing inter prediction or intra block copy (IBC) of a current block. The video coding method and apparatus separately determine each spatial resolution for a plurality of motion vectors.

The following embodiments may be applied to the intra predictor 124 in the video encoding apparatus. Further, the embodiments can be applied to the entropy decoder 510 and the inter predictor 544 in the video decoding apparatus.

In the following description, the term 'target block' to be coded or decoded may be used with the same meaning as a current block or coding unit (CU) as described above, or may mean a partial region of the coding unit.

Hereinafter, a specific flag being true indicates that a value of the flag is 1, and the specific flag being false indicates that the value of the flag is 0.

I. Adaptive Motion Vector Resolution (AMVR)

As described above, in the inter prediction of the AMVP scheme, in order to obtain the motion vector predictor of the current block, the video decoding apparatus forms an AMVP candidate list in the same way as the video encoding apparatus, selects a candidate corresponding to amvp_flag transmitted from the video encoding apparatus, and uses the candidate as the motion vector predictor. In this case, amvp_flag indicates one element in the AMVP candidate list. Since the motion vector difference is additionally transmitted from the video encoding apparatus, the video decoding apparatus may add the motion vector predictor to the motion vector difference to generate the motion vector of the current block. The video encoding apparatus transmits information for determining spatial resolution of the motion vector difference together with the motion vector difference.

Hereinafter, since the spatial resolution of the motion vector difference is the same as the spatial resolution of the motion vector, an expression "spatial resolution of the motion vector" is used instead of the spatial resolution of the motion vector difference. In addition, AMVR is 'adaptive motion vector resolution', but may be used interchangeably with a name 'adaptive spatial resolution' hereinafter.

The video encoding apparatus may determine the adaptive spatial resolution of the motion vector on the basis of rate distortion optimization, and selectable spatial resolution of the motion vector may vary depending on the prediction mode in which AMVR is applied to the current block. Prediction modes in which AMVR is applicable include a general inter prediction, an affine model based inter prediction, and an IBC mode.

When the AMVR technology is used, the video encoding apparatus signals amvr_flag and amvr_precision_idx to the video decoding apparatus to notify of the spatial resolution of the motion vector. In an embodiment, when amvr_flag is signaled as 0, the video decoding apparatus sets the motion vector to 1/4-pel spatial resolution. On the other hand, when amvr_flag is not 0, the video decoding apparatus may determine the spatial resolution of the motion vector according to amvr_precision_idx.

Hereinafter, amvr_flag is referred to as an AMVR flag, and amvr_precision_idx is referred to as an AMVR precision index.

For each prediction mode, the spatial resolution of the motion vector can be set as shown in Table 1 on the basis of amvr_flag and amvr_precision_idx. In the case of the IBC mode, amvr_flag is not signaled because amvr_flag is always regarded to be 1.

TABLE 1

| | | Spatial resolution of motion vector | | |
| amvr_flag | amvr_precision_idx | affine model based inter prediction | IBC mode | General inter prediction |
| --- | --- | --- | --- | --- |
| 0 | — | 1/4 | — | 1/4 |
| 1 | 0 | 1/16 | 1 | 1/2 |
| | 1 | 1 | 4 | 1 |
| | 2 | — | — | 4 |

As an example, when the prediction mode of the current block is general inter prediction, amvr_flag is signaled as 1, and amvr_precision_idx is signaled as 2, the spatial resolution of the motion vector is set to 4-pel.

When the spatial resolution of the motion vector is determined, the spatial resolution values of the horizontal component and the vertical component are always determined to be the same value, and this characteristic may lead to some inefficiency problems. In particular, this inefficiency problem is remarkable when a difference between the horizontal component and the vertical component of the motion vector difference is large. For example, a case in which the value of the motion vector is (2, 1/4) as shown in Table 2 is considered.

TABLE 2

| Actual value of motion vector difference | Motion vector difference according to spatial resolution | |
| | 1/4-pel | 1-pel |
| --- | --- | --- |
| (2, 1/4) | (8, 1) | (2, 0) |

When the existing AMVR technology is used, the spatial resolution of the motion vector is determined as one for the horizontal component and the vertical component. Table 2 shows an example in which two spatial resolution values of 1/4-pel and 1-pel are applied. When the spatial resolution is determined to be 1/4-pel, the motion vector difference is transmitted as (8, 1), and thus, a transmission overhead for the horizontal component increases. On the other hand, when the spatial resolution is determined to be 1-pel, the motion vector difference is transmitted as (2, 0). In this case, a data loss may occur when the vertical component of the motion vector difference is rounded off in a process of expression in units of values greater than an original value. Therefore, when any one of the two spatial resolutions is selected, inefficiency in which efficient coding becomes difficult occurs.

Further, in a case in which basic units of the horizontal component and the vertical component of the motion vector are different, the inefficiency becomes clearer when the existing AMVR technology is used. For example, in the case of a hexagonal pixel array illustrated in FIG. 6, the horizontal component of the motion vector has a spatial resolution of 1-pel, while the vertical component has a spatial resolution of 1/√3-pel. When the existing AMVR technology is used, the spatial resolution values of the two components are determined to be a single value, and thus, a data loss in a rounding process is inevitable regardless of which of 1 and 1/√3 is selected for the spatial resolution of the motion vector difference. The problem of such an existing technology can be solved by adaptively determining each of the spatial resolution values of the horizontal component and the vertical component of the motion vector to be transmitted.

Additionally, when prediction is performed using a plurality of motion vectors, there is a problem in that spatial resolution values of all the motion vectors are determined to be a single one. In this case, it is also possible to solve the problem by setting the spatial resolution of each motion vector. Further, it is very important for the video encoding apparatus to efficiently signal the spatial resolution for each component to the video decoding apparatus.

II. Examples According to the Present Disclosure

Hereinafter, several examples for solving the above problems, according to some embodiments, are described.

Hereinafter, the present examples are described focusing on a determination of the adaptive spatial resolution of the current block by the video decoding apparatus. Such adaptive spatial resolution determination may be performed by the entropy decoder 510 and the inter predictor 544 in the video decoding apparatus. For convenience of description, the video encoding apparatus is referred to, when necessary. Nevertheless, at least some of the examples described below can be equally or similarly applied to the video encoding apparatus. In an embodiment, the video encoding apparatus determines information (flags and indices described below) related to the adaptive spatial resolution determination in terms of rate distortion optimization. Thereafter, the video encoding apparatus may encode these to generate a bitstream, and then signal the bitstream to the video decoding apparatus. Further, the video encoding apparatus may acquire the information related to adaptive spatial resolution determination from a high level to determine the spatial resolution of the motion vector of the current block.

<Example 1> Method of Signaling the Spatial
Resolution Values of the Horizontal Component
and the Vertical Component of the Motion Vector
Using a Flag Indicating that the Spatial Resolution
Values of the Two Components are the Same In the present example, the video encoding apparatus signals the spatial resolution values of the horizontal component and the vertical component of the motion vector in order to reduce an overhead or loss and improve coding efficiency with an optimal resolution in transmission of the motion vector of the current block. The video encoding apparatus may signal amvr_equal_flag to the video decoding apparatus to indicate whether or the spatial resolution values of the horizontal and vertical components are the same. When amvr_equal_flag is 0, this indicates that the spatial resolutions of the horizontal component and the vertical component are different, and when amvr_equal_flag is 1, this indicates that the spatial resolution values of the two components are the same.

Hereinafter, amvr_equal_flag is referred to as a same resolution flag.

Then, the video encoding apparatus may signal all or some of amvr_flag_x, amvr_flag_y, amvr_precision_idx_x, and amvr_precision_idx_y to the video decoding apparatus. amvr_flag_x and amvr_flag_y indicate whether AMVR according to embodiments of the present disclosure is applied to the horizontal component and the vertical component, respectively. When the flag is 0, the AMVR technology according to embodiments of the present disclosure is not applied. When the flag is 1, the video encoding apparatus may transmit amvr_precision_idx_x or amvr_precision_idx_y to adaptively select the spatial resolution.

Hereinafter, amvr_flag_x is referred to as a horizontal component AMVR flag, and amvr_flag_y is referred to as a vertical component AMVR flag. Further, amvr_precision_idx_x is referred to as a horizontal component precision index, and amvr_precision_idx_y is referred to as a vertical component precision index.

A spatial resolution determination method according to amvr_flag_x (or amvr_flag_y) and amvr_precision_idx_x (or amvr_precision_idx_y) may be implemented similarly to a spatial resolution determination method according to amvr_flag and amvr_precision_idx in the related art. The spatial resolution values based on the flags and indices described above are as shown in Table 3.

tial resolution of the horizontal component is determined as 1/4-pel. Since amvr_flag_y=1 can be inferred on the basis of amvr_equal_flag=0, amvr_flag_y is not transmitted. The video decoding apparatus parses amvr_precision_idx_y. When amvr_precision_idx_y is 1, the video decoding apparatus determines the spatial resolution of the vertical component to be 1-pel. Therefore, the actual value of the motion vector difference becomes (1/4, 2).

As another example, it is assumed that the parsed motion vector difference is (1, 1). When amvr_equal_flag=1 and is signaled as amvr_flag_x=1, the video decoding apparatus additionally parses amvr_precision_idx_x. When amvr_precision_idx_x is 1, the video decoding apparatus determines the spatial resolution of the horizontal component to be 1-pel. Further, since amvr_equal_flag=1, neither amvr_flag_y nor amvr_precision_idx_y is transmitted. The video decoding apparatus determines the spatial resolution of the vertical component to be 1-pel, as in the spatial resolution of the horizontal component. Therefore, the actual value of the motion vector difference becomes (1, 1).

For a signaling order of amvr_equal_flag, the video decoding apparatus may first parse amvr_flag_x and amvr_precision_idx_x and then parse amvr_equal_flag. Nevertheless, this implementation also results in the same results as the implementation described above.

Further, Table 3 illustrates an example in which amvr_flag_x is first parsed and then a determination is made as to whether or not amvr_flag_y is parsed, but the opposite case is also possible. In other words, the video decoding apparatus may parse amvr_flag_y and then determine whether or not amvr_flag_x is parsed.

<Example 2> Method of Sharing amvr_flag of the Horizontal Component and the Vertical Component of the Motion Vector and Separately Signaling amvr_precision_idx of the Horizontal Component and the Vertical Component of the Motion Vector In the present example, in order to set differently the spatial resolution values of the horizontal component and the

TABLE 3

| amvr_equal_flag | amvr_flag_x | amvr_precision_idx_x | amvr_flag_y | amvr_precision_idx_y |
|---|---|---|---|---|
| 0 | 0 | X (1/4-pel) | X | 0 (1/2-pel) |
| | | | | 1 (1-pel) |
| | | | | 2 (4-pel) |
| | 1 | 0 (1/2-pel) | 0 | X (1/4-pel) |
| | | | 1 | 1 (1-pel) |
| | | | | 2 (4-pel) |
| | | 1 (1-pel) | 0 | X (1/4-pel) |
| | | | 1 | 0 (1/2-pel) |
| | | | | 2 (4-pel) |
| | | 2 (4-pel) | 0 | X (1/4-pel) |
| | | | 1 | 0 (1/2-pel) |
| | | | | 1 (1-pel) |
| 1 | 0 | X (1/4-pel) | X | X (1/4-pal) |
| | 1 | 0 (1/2-pel) | | X (1/2-pel) |
| | | 1 (1-pel) | | X (1-pel) |
| | | 2 (4-pel) | | X (4-pel) |

60

In Table 3, 'X' means that no signaling, and the content in parentheses indicates the spatial resolution of each component.

A specific example for Table 3 is as follows. As an example, it is assumed that the motion vector difference parsed by the video decoding apparatus is (1, 2). When the transmitted amvr_equal_flag=0 and amvr_flag_x=0, the spavertical component of the motion vector, the video encoding apparatus shares the amvr_flag of the horizontal component and the vertical component of the motion vector, but signals each of amvr_precision_idx_x and amvr_precision_idx_y. The spatial resolution based on the flags and indices described above is shown in Table 4.

TABLE 4

| amvr_flag | amvr_precision_idx_x | amvr_precision_idx_y |
|-----------|----------------------|----------------------|
| 0 | X (¼ pel) | X (¼ pel) |
| 1 | 0 (½-pel) | 0 (½-pal) |
| | | 1 (1-pel) |
| | | 2 (4-pel) |
| | 1 (1-pel) | 0 (½-pel) |
| | | 1 (1-pel) |
| | | 2 (4-pel) |
| | 2 (4-pel) | 0 (½-pel) |
| | | 1 (1-pel) |
| | | 2 (4-pel) |

In Table 4, 'X' means no signaling, and the content in parentheses indicates the spatial resolution of each component.

A specific example for Table 4 is as follows. As an example, it is assumed that the motion vector difference parsed by the video decoding apparatus is (4, 1). When the transmitted amvr_flag is 0, this means that both amvr_precision_idx_x and amvr_precision_idx_y are not transmitted and the spatial resolution values of the horizontal and vertical components of the motion vector are both 1/4-pel. Therefore, the actual value of the transmitted motion vector difference becomes (1, 1/4).

As another example, it is assumed that the motion vector difference parsed by the video decoding apparatus is (2, 1). When the transmitted amvr_flag is 1, the video decoding apparatus additionally parses amvr_precision_idx_x and amvr_precision_idx_y to determine the spatial resolution values of the horizontal and vertical components of the motion vector. When amvr_precision_idx_x=1 and amvr_precision_idx_y=0, this means that the spatial resolution of the horizontal component of the motion vector is 1-pel and the spatial resolution of the vertical component is 1/2-pel. Therefore, the actual value of the transmitted motion vector difference becomes (2, 1/2).

<Example 3> Method of Separately Signaling Both amvr_flag and amvr_precision_idx for the Horizontal Component and the Vertical Component of the Motion Vector In the present example, in order to set the spatial resolution values of the horizontal component and the vertical component of the motion vector to be different from each other, the video encoding apparatus signals both amvr_flag and amvr_precision_idx for the horizontal and vertical components respectively. The video decoding apparatus determines the spatial resolution of the horizontal component using amvr_flag_x and amvr_precision_idx_x, and determines the spatial resolution of the vertical component using amvr_flag_y and amvr_precision_idx_y. For each component, the spatial resolution can be determined according to Table 1. In other words, in the present example, the same operation as the AMVR technology of the related art is repeatedly performed on the horizontal component and the vertical component.

As an example, it is assumed that the motion vector difference parsed by the video decoding apparatus is (3, 1). The video decoding apparatus parses amvr_flag_x and amvr_flag_y. When both the flags are 0, this means that the spatial resolution values of the horizontal component and the vertical component of the motion vector are both 1/4-pa. Therefore, the actual value of the transmitted motion vector difference becomes (3/4, 1/4).

As another example, it is assumed that the motion vector difference parsed by the video decoding apparatus is (1, 1). When the transmitted amvr_flag_x is 0 and amvr_flag_y is 1, the video decoding apparatus determines the spatial resolution of the horizontal component of the motion vector to be 1/4-pa and determines the spatial resolution of the vertical component according to amvr_precision_idx_y. When amvr_precision_idx_y=1 is signaled, this means that the spatial resolution of the vertical component is 1-pa. Therefore, the actual value of the transmitted motion vector difference becomes (1/4, 1).

<Example 4> Method of Signaling the Spatial Resolution Values of Vertical and Horizontal Components of the Motion Vector Using an Index It may be inefficient to transmit all of amvr_flag_x, amvr_flag_y, amvr_precision_idx_x, and amvr_precision_idx_y in order to set the spatial resolution values of the horizontal component and the vertical component of the motion vector to be different from each other. In the present example, the video encoding apparatus signals only one resolution_set_index instead of transmitting all of the four flags. Using resolution_set_index signaled from the video encoding apparatus, the video decoding apparatus may select a preset pair of the spatial resolutions of the horizontal component and the vertical component, as shown in Table 5.

TABLE 5

| resolution_set_index | (spatial resolution of horizontal component, spatial resolution of vertical component) |
|----------------------|----------------------------------------------------------------------------------------|
| 0 | (¼, ½) |
| 1 | (½, ¼) |
| 2 | (¼, 1) |
| 3 | (1, ¼) |
| . | . |
| . | . |
| . | . |

As an example, it is assumed that the motion vector difference parsed by the video decoding apparatus is (1, 3) with respect to the preset spatial resolution list as shown in Table 5. When the transmitted resolution_set_index is 1, this means that the spatial resolution of the horizontal component of the motion vector is 1/2-pel and the spatial resolution of the vertical component is 1/4-pel. Therefore, the actual value of the transmitted motion vector difference becomes (1/2, 3/4).

<Example 5> Method of Setting Spatial Resolution for Each Vector by Applying the Methods of Examples 1 to 4 to a Plurality of Motion Vectors In inter prediction, general inter prediction may use unidirectional motion vectors or bidirectional motion vectors. In the related art, when prediction of a current block is performed using bi-directional motion vectors, spatial resolution values of two motion vectors cannot be determined to be different from each other. Further, in inter prediction based on an affine model, motion vectors of two or three control points are used to derive the motion vector of the current block. In this case, spatial resolution values of motion vectors of a plurality of control points cannot be determined to be different from each other.

Accordingly, in the present example, the spatial resolution values of the plurality of motion vectors are determined to be different from each other in the inter prediction using bi-directional motion vectors and the inter prediction based on the affine model using the plurality of control points. The method for determining the spatial resolution of each motion vector in the present example is the same as in the above-described Examples 1 to 4. However, the spatial resolution of each vector may be determined by using amvr_flag_v1 and amvr_flag_v2 instead of amvr_flag_x and amvr_flag_y, and using amvr_precision_idx_v1 and amvr_precision_idx_v2 instead of amvr_precision_idx_x and amvr_precision_idx_y.

As an example in which Example 5 is applied, it is assumed that a difference of a motion vector MV1 parsed by the video decoding apparatus is (1, 2) and a difference of a motion vector MV2 is (2, 3). When amvr_flag_v1=1, amvr_precision_idx_v1=0, and amvr_flag_v2=0, this means that the spatial resolution of the motion vector MV1 is 1/2-pel and the spatial resolution of the motion vector MV2 is 1/4-pa. Therefore, an actual value of the difference of the motion vector MV1 is (1/2, 1) and an actual value of the difference of the motion vector MV2 is (1/2, 3/4).

As another embodiment, Examples 1 to 4 may be applied to set the spatial resolutions of the respective components in each motion vector to be different from each other.

<Example 6> Method for Setting Basic Spatial Resolution for Horizontal Component and Vertical Component In the description of Examples 1 to 5 described above, three units (for example, 1-pa, 1/2-pa, and 1/4-pa) are used as selectable adaptive spatial resolution values, but the present disclosure is not necessarily limited thereto. Therefore, an implementation in which values that are not equal to the three units described above are used as the adaptive spatial resolution values is also possible. In the present examples, since a key concept is to select a horizontal spatial resolution and a vertical spatial resolution among a plurality of spatial resolution values, a plurality of spatial resolution values to be provided can be changed depending on applications. In addition, in the above description, it is assumed that the three spatial resolution values are used, but the present disclosure is not necessarily limited thereto. Thus, two or four spatial resolution values may be used, and five or more spatial resolution values may also be used.

As another embodiment, a basic spatial resolution for each component may be set in advance for horizontal and vertical spatial resolution values between the video encoding apparatus and the video decoding apparatus. Alternatively, after the video encoding apparatus transmits the basic spatial resolution for each component to the video decoding apparatus, the video encoding apparatus may transmit a multiple of the basic spatial resolution to implement the motion vector of the current block.

Figure 6:
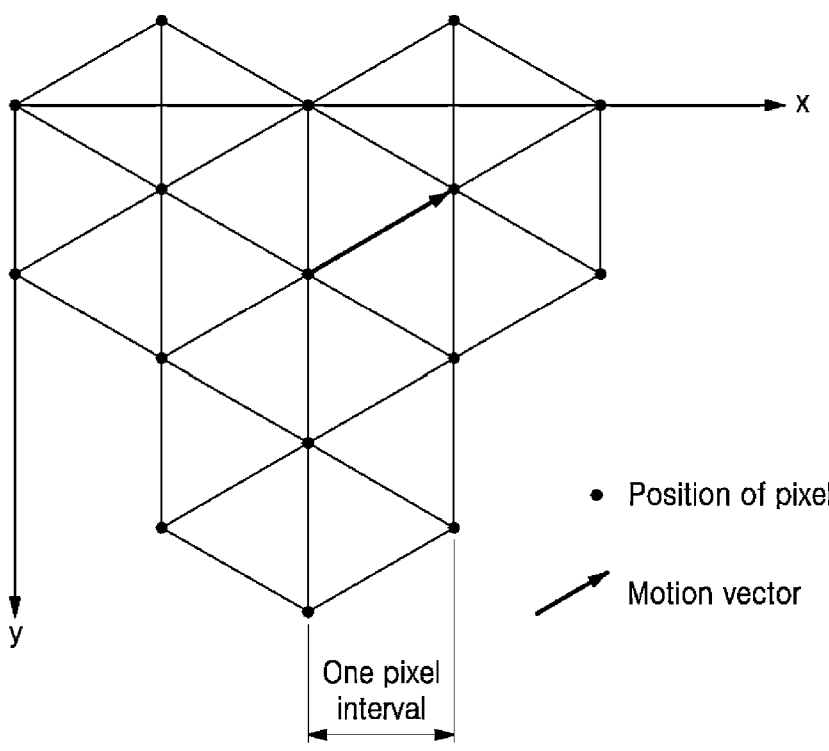
FIG. 6 is an illustrative diagram illustrating a hexagonal pixel arrangement that may be used with embodiments of the present disclosure.
Figure 6:
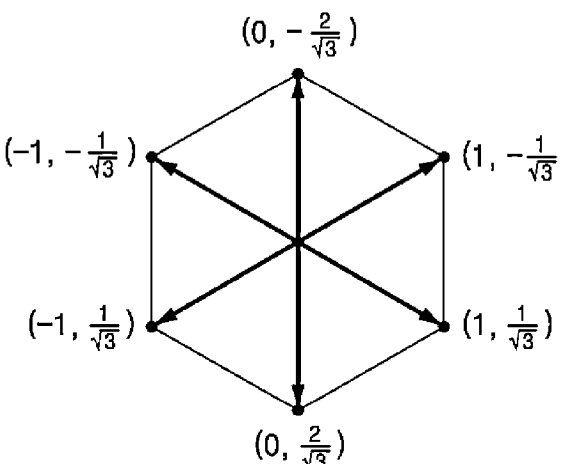

For example, in the case of the hexagonal pixel arrangement illustrated in FIG. 6, the basic spatial resolution for each component may be set in advance between the video encoding apparatus and the video decoding apparatus, such that the horizontal component is 1-pel and the vertical component is $1/\sqrt{3}$-pel. Alternatively, the video encoding apparatus may signal the basic spatial resolution for each component to the video decoding apparatus.

Further, when the video encoding apparatus transmits the motion vector information of the current block, the video encoding apparatus may transmit only a multiple of the basic spatial resolution for each component for the horizontal component and the vertical component. In this case, a plurality of spatial resolution values (actually, the multiple of the basic spatial resolution for each component) may be selected on the basis of the methods of Examples 1 to 6 to express the difference of the motion vector.

Hereinafter, a method of determining the spatial resolution values of the horizontal component and the vertical component of the difference of the motion vector for the current block according to the adaptive spatial resolution illustrated in Example 1, according to an embodiment, is described with reference to FIGS. 7 and 8. As described above, the spatial resolution of the motion vector difference is regarded as the same as the spatial resolution of the motion vector.

Figure 7:
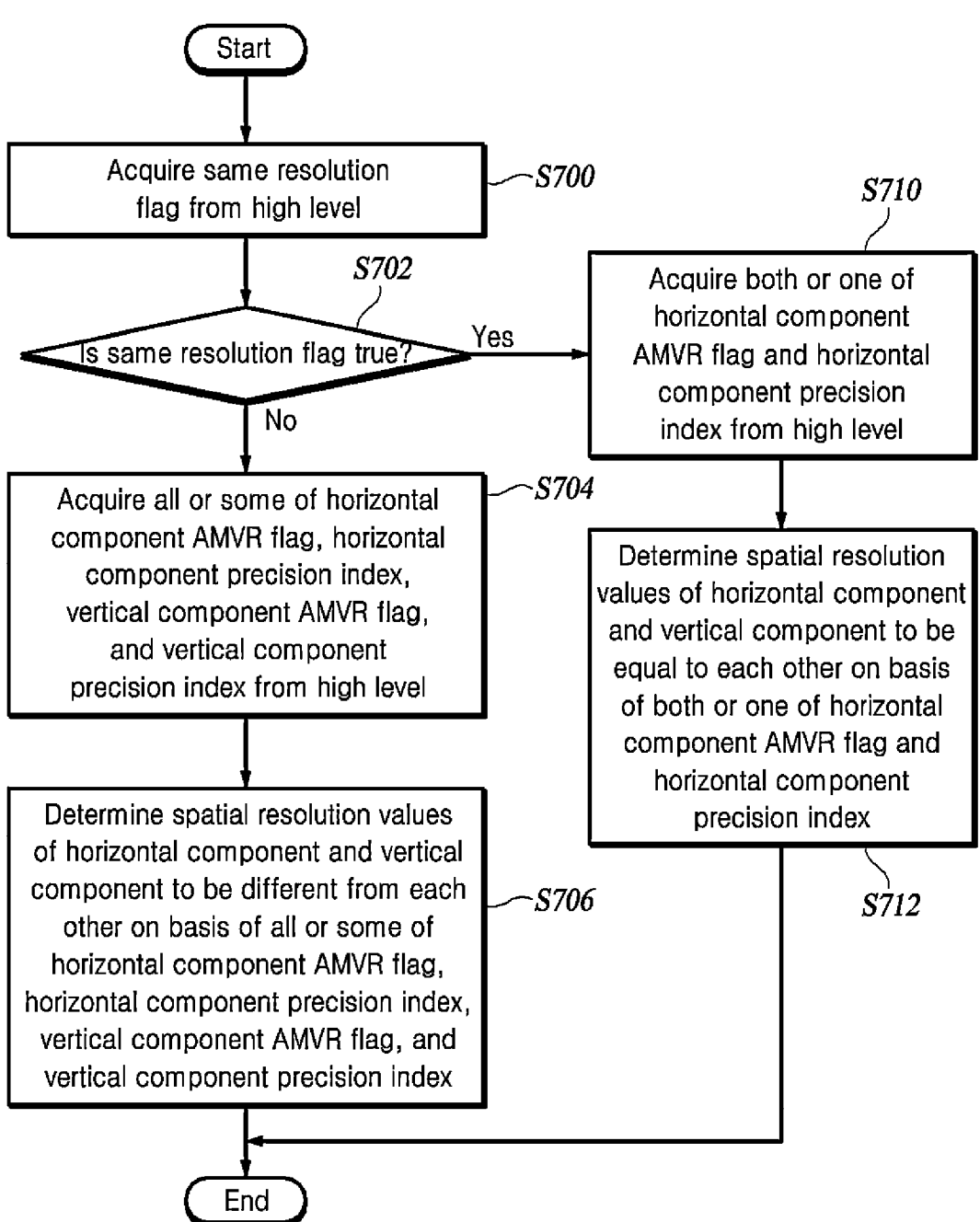
FIG. 7 is a flowchart illustrating a method of determining a spatial resolution performed by a video encoding apparatus according to an embodiment of the present disclosure.

FIG. 7 is a flowchart illustrating a method of determining the spatial resolution performed by the video encoding apparatus according to an embodiment of the present disclosure.

In an operation S700, the video encoding apparatus acquires the same resolution flag from a high level. In an embodiment, amvr_equal_flag that is a same resolution flag indicates whether the spatial resolutions of the horizontal component and the vertical component are the same with respect to the difference of the motion vector of the current block.

In an operation S702, the video encoding apparatus checks the same resolution flag.

According to the example of Table 3 of Example 1, the video encoding apparatus may determine the spatial resolutions of the horizontal component and the vertical component of the difference of the motion vector.

When the same resolution flag is false (No in the operation S702), the video encoding apparatus performs the following operations.

In an operation S704, the video encoding apparatus acquires all or some of the horizontal component AMVR flag, the horizontal component precision index, the vertical component AMVR flag, and the vertical component precision index from the high level (S704).

In an embodiment, amvr_flag_x that is the horizontal component AMVR flag and amvr_flag_y that is the vertical component AMVR flag indicate whether the adaptive spatial resolution is applied to each component. Further, amvr_precision_idx_x that is the horizontal component precision index, and amvr_precision_idx_y that is the vertical component precision index indicate one of the preset spatial resolutions.

The video encoding apparatus acquires the horizontal component precision index when the horizontal component AMVR flag is true, and acquires the vertical component precision index when the vertical component AMVR flag is true.

Further, when the horizontal component AMVR flag is false, the video encoding apparatus derives the vertical component AMVR flag to be true without acquiring the vertical component AMVR flag, and then acquires the vertical component precision index.

In an operation S706, the video encoding apparatus determines the spatial resolution values of the horizontal component and the vertical component to be different from each other on the basis of all or some of the horizontal component AMVR flag, the horizontal component precision index, the vertical component AMVR flag, and the vertical component precision index.

When the horizontal component AMVR flag is false, the video encoding apparatus determines the spatial resolution of the horizontal component to be a preset value. Further, the video encoding apparatus may determine the spatial resolution of the vertical component on the basis of the vertical component precision index, but determine the spatial resolution of the vertical component to be a value different from the spatial resolution of the horizontal component, as shown in Table 3.

When the horizontal component AMVR flag is true and the vertical component AMVR flag is false, the video encoding apparatus determines the spatial resolution of the vertical component to be a preset value. Further, the video encoding apparatus may determine the spatial resolution of the horizontal component on the basis of the horizontal component precision index, but determine the spatial resolution of the horizontal component to be a value different from the spatial resolution of the vertical component, as shown in Table 3.

When the horizontal component AMVR flag is true and the vertical component AMVR flag is also true, the video encoding apparatus determines the spatial resolution of the horizontal component on the basis of the horizontal component precision index. Further, the video encoding apparatus may determine the spatial resolution of the vertical component on the basis of the vertical component precision index, but determine the spatial resolution of the vertical component to be a value different from the spatial resolution of the horizontal component, as shown in Table 3.

On the other hand, when the same resolution flag is true (Yes in the operation S702), the video encoding apparatus performs the following operations.

In an operation S710, the video encoding apparatus acquires one or both of the horizontal component AMVR flag and the horizontal component precision index from the high level.

In an operation S712, the video encoding apparatus determines the spatial resolution values of the horizontal component and the vertical component to be equal to each other on the basis of one or both of the horizontal component AMVR flag and the horizontal component precision index (S712).

When the horizontal component AMVR flag is false, the video encoding apparatus determines the spatial resolution values of the horizontal component and the vertical component to be the same predetermined value. Further, when the horizontal component AMVR flag is true, the video encoding apparatus may determine the spatial resolution values of the horizontal component and the vertical component to be equal to each other on the basis of the horizontal component precision index, as shown in Table 3.

Meanwhile, the video encoding apparatus may calculate the actual value of the motion vector difference of the current block using the determined spatial resolution values of the horizontal component and the vertical component.

Figure 8:
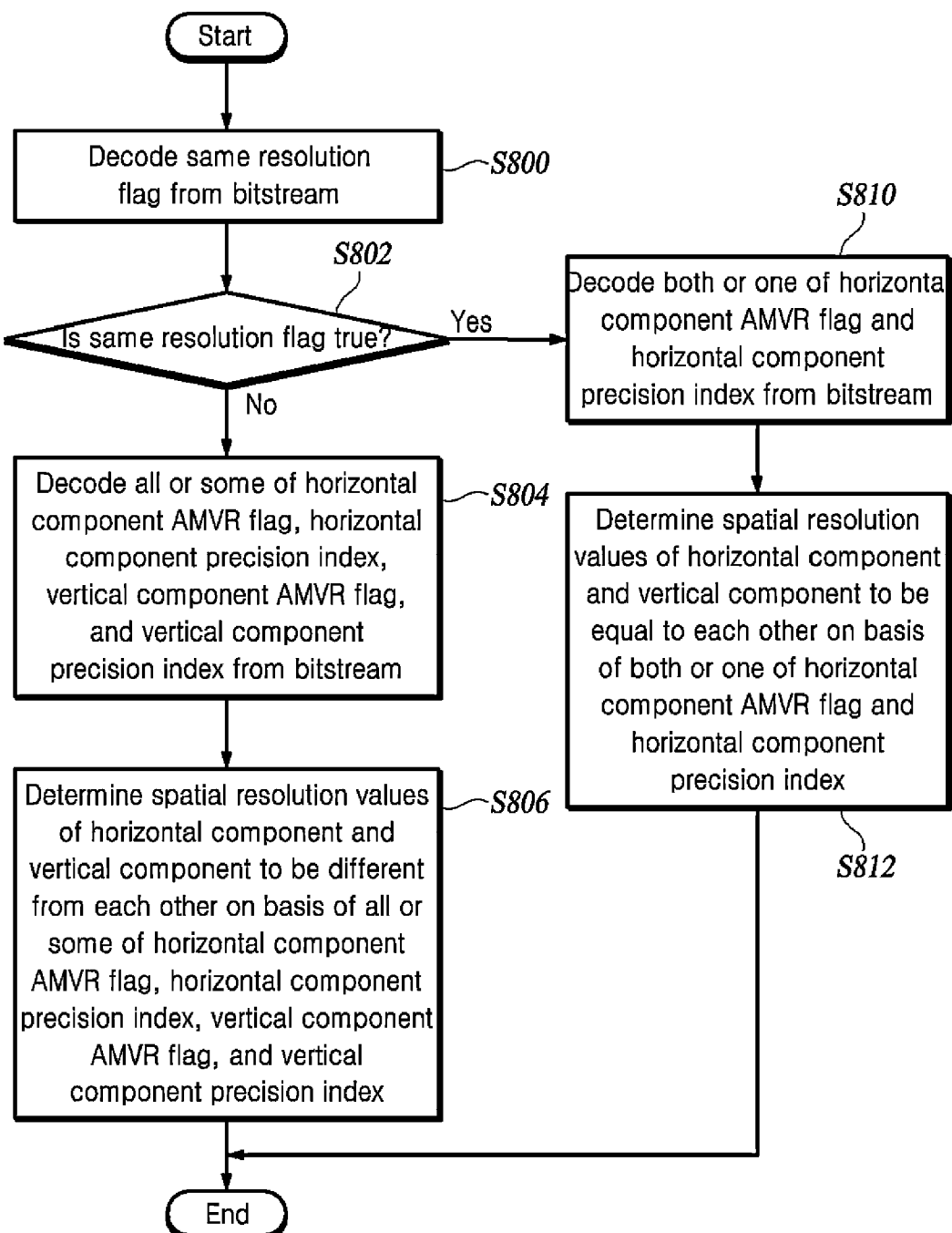
FIG. 8 is a flowchart illustrating a method of determining the spatial resolution performed by a video decoding apparatus according to an embodiment of the present disclosure.

FIG. 8 is a flowchart illustrating the method of determining the spatial resolution performed by the video decoding apparatus according to an embodiment of the present disclosure.

In an operation S800, the video decoding apparatus decodes a same resolution flag from the bitstream. In an embodiment, amvr_equal_flag that is the same resolution flag indicates whether the spatial resolution values of the horizontal component and the vertical component are equal with respect to the difference of the motion vector of the current block.

In an operation S802, the video decoding apparatus checks the same resolution flag.

According to the example of Table 3 of Example 1, the video decoding apparatus may determine the spatial resolution values of the horizontal component and the vertical component of the motion vector difference.

When the same resolution flag is false (No in the operation S802), the video decoding apparatus performs the following operations.

In an operation S804, the video decoding apparatus decodes all or some of the horizontal component AMVR flag, the horizontal component precision index, the vertical component AMVR flag, and the vertical component precision index from the bitstream.

In an embodiment, amvr_flag_x that is the horizontal component AMVR flag and amvr_flag_y that is the vertical component AMVR flag indicate whether or not the adaptive spatial resolution is applied to each component. In addition, amvr_precision_idx_x that is the horizontal component precision index, and amvr_precision_idx_y that is the vertical component precision index indicate one of the preset resolution values.

The video decoding apparatus decodes the horizontal component precision index when the horizontal component AMVR flag is true, and decodes the vertical component precision index when the vertical component AMVR flag is true.

Further, when the horizontal component AMVR flag is false, the video decoding apparatus derives the vertical component AMVR flag to be true without acquiring the vertical component AMVR flag, and then decodes the vertical component precision index.

In an operation S806, the video decoding apparatus determines the spatial resolution values of the horizontal component and the vertical component to be different from each other on the basis of the horizontal component AMVR flag, the horizontal component precision index, the vertical component AMVR flag, and the vertical component precision index.

When the horizontal component AMVR flag is false, the video decoding apparatus determines the spatial resolution of the horizontal component to be a preset value. Further, the video decoding apparatus may determine the spatial resolution of the vertical component on the basis of the vertical component precision index, but determine the spatial resolution of the vertical component to be a value different from the spatial resolution of the horizontal component, as shown in Table 3.

When the horizontal component AMVR flag is true and the vertical component AMVR flag is false, the video decoding apparatus determines the spatial resolution of the vertical component to be a preset value. Further, the video decoding apparatus may determine the spatial resolution of the horizontal component on the basis of the horizontal component precision index, but determine the spatial resolution of the horizontal component to be a value different from the spatial resolution of the vertical component, as shown in Table 3.

When the horizontal component AMVR flag is true and the vertical component AMVR flag is also true, the video decoding apparatus determines the spatial resolution of the horizontal component on the basis of the horizontal component precision index. Further, the video decoding apparatus may determine the spatial resolution of the vertical component on the basis of the vertical component precision index, but determine the spatial resolution of the vertical component to be a value different from the spatial resolution of the horizontal component, as shown in Table 3.

On the other hand, when the same resolution flag is true (Yes in the operation S802), the video decoding apparatus performs the following operations.

In an operation S810, the video decoding apparatus decodes one or both of the horizontal component AMVR flag and the horizontal component precision index from the bitstream.

In an operation S812, the video decoding apparatus determines the spatial resolution values of the horizontal component and the vertical component to be equal to each other on the basis of one or both of the horizontal component AMVR flag and the horizontal component precision index.

When the horizontal component AMVR flag is false, the video decoding apparatus determines the spatial resolution values of the horizontal component and the vertical component to be the same predetermined value. Further, when the horizontal component AMVR flag is true, the video decoding apparatus may determine the spatial resolution values of the horizontal component and the vertical component to be equal to each other on the basis of the horizontal component precision index, as shown in Table 3.

The video decoding apparatus may calculate the actual value of the motion vector difference of the current block using the determined spatial resolution values of the horizontal component and the vertical component.

Hereinafter, a method of determining the spatial resolution values of the horizontal component and the vertical component of the difference of the motion vector for the current block according to the adaptive spatial resolution illustrated in Example 2, according to an embodiment, is described with reference to FIGS. 9 and 10. As described above, the spatial resolution of the motion vector difference is regarded as the same as the spatial resolution of the motion vector.

Figure 9:
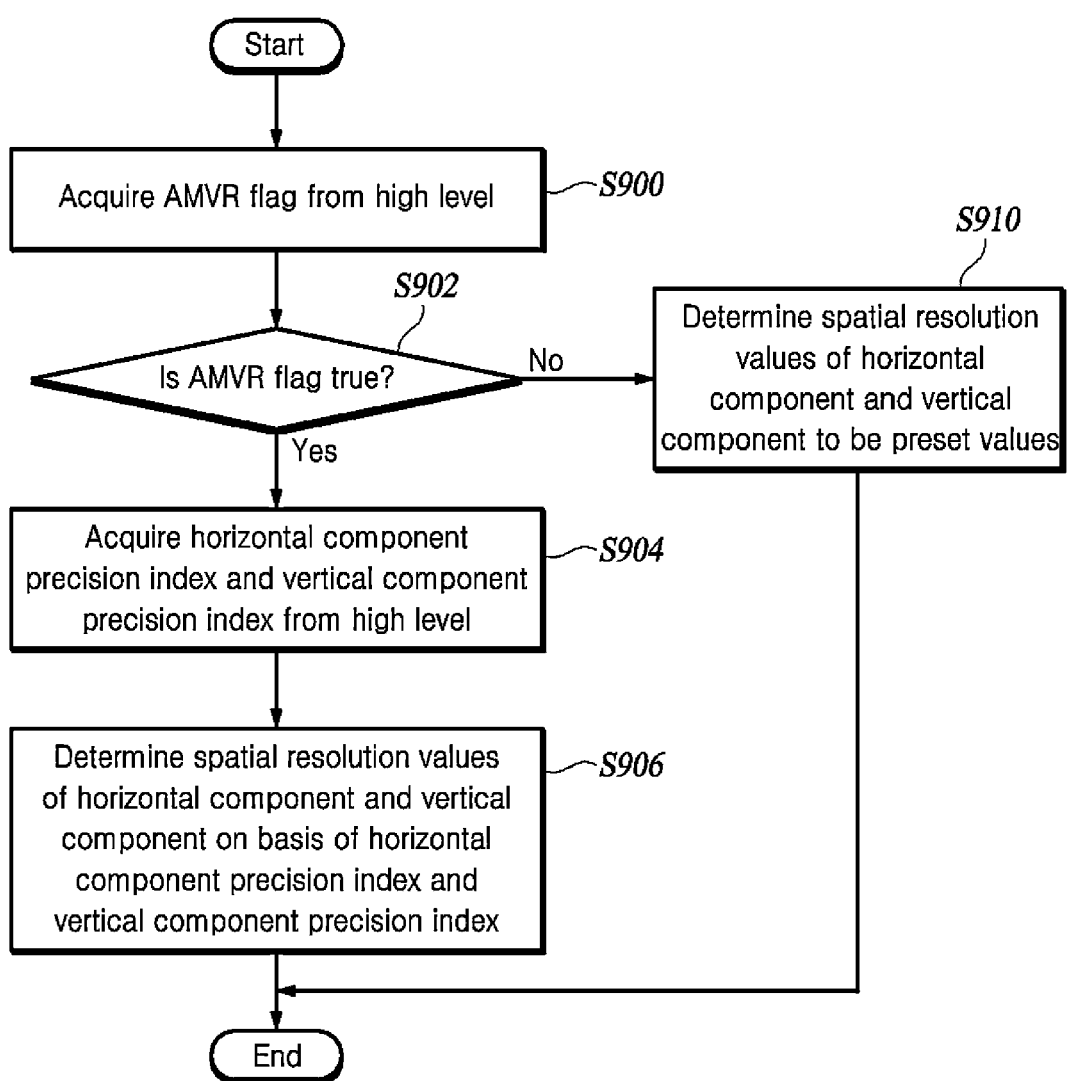
FIG. 9 is a flowchart illustrating a method of determining a spatial resolution performed by a video encoding apparatus according to another embodiment of the present disclosure.

FIG. 9 is a flowchart illustrating the method of determining the spatial resolution performed by a video encoding apparatus according to another embodiment of the present disclosure.

In an operation S900, the video encoding apparatus acquires the AMVR flag from a high level. Here, amvr_flag that is the AMVR flag indicates whether or not the adaptive spatial resolution is applied to the horizontal component and the vertical component, with respect to the difference of the motion vector of the current block.

In an operation S902, the video encoding apparatus checks the AMVR flag.

According to the example of Table 4 of Example 2, the video encoding apparatus may determine the spatial resolution values of the horizontal component and the vertical component of the motion vector difference.

When the AMVR flag is true (Yes in the operation S902), the video encoding apparatus performs the following operations.

In an operation S904, the video encoding apparatus acquires the horizontal component precision index and the vertical component precision index from a high level. In an embodiment, amvr_flag_x that is the horizontal component AMVR flag and amvr_flag_y that is the vertical component AMVR flag indicate one of the preset spatial resolution values.

In an operation S906, the video encoding apparatus determines the spatial resolution values of the horizontal component and the vertical component on the basis of the horizontal component precision index and the vertical component precision index. The video encoding apparatus determines the spatial resolution of the horizontal component on the basis of the horizontal component precision index, and determines the spatial resolution of the vertical component on the basis of the vertical component precision index.

On the other hand, when the AMVR flag is false (No in the operation S902), the video encoding apparatus, in an operation S910, determines the spatial resolution of the horizontal component and the spatial resolution of the vertical component to be preset values.

The video encoding apparatus may calculate the actual value of the motion vector difference of the current block using the determined spatial resolution values of the horizontal component and the vertical component.

Figure 10:
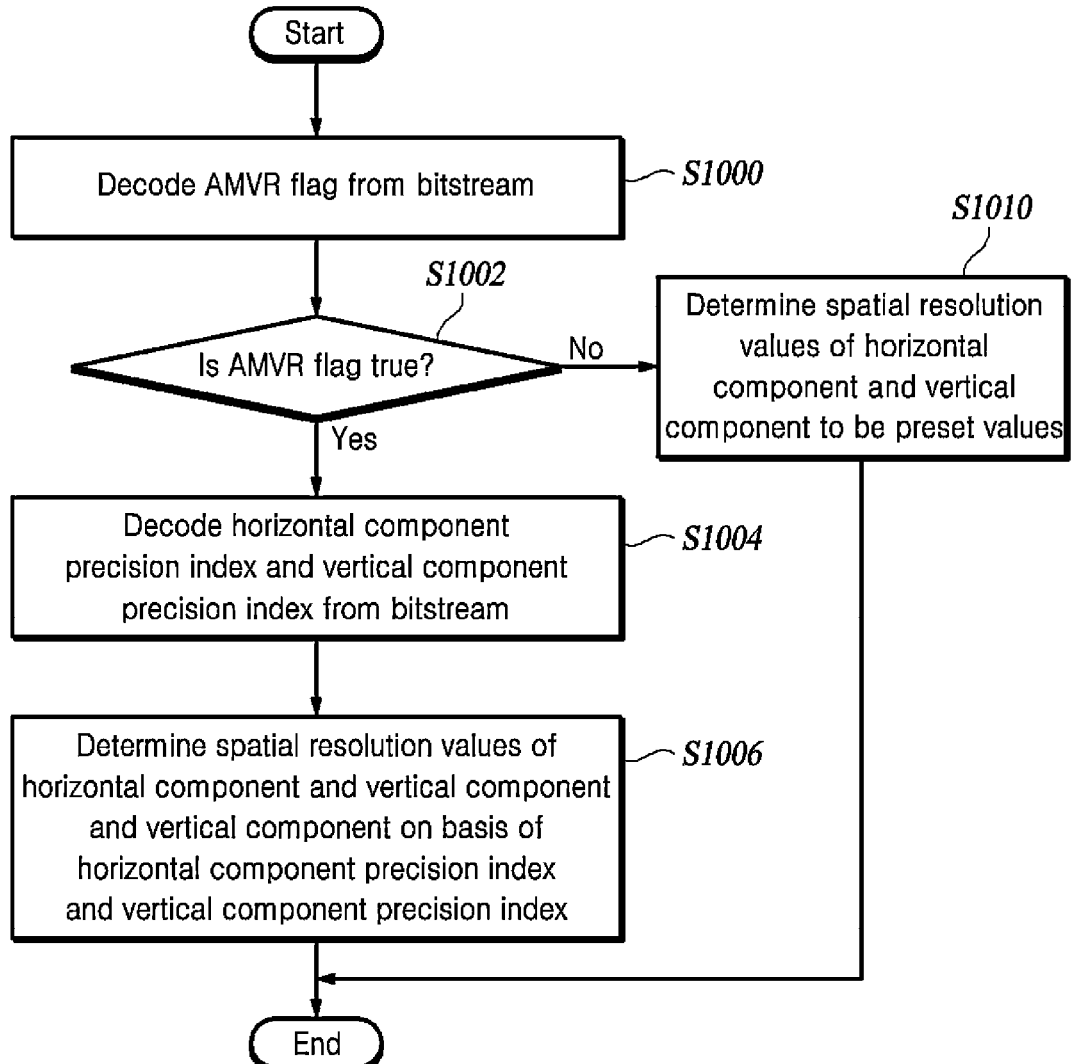
FIG. 10 is a flowchart illustrating a method of determining a spatial resolution performed by a video decoding apparatus according to another embodiment of the present disclosure.

FIG. 10 is a flowchart illustrating the method of determining the spatial resolution performed by the video decoding apparatus according to another embodiment of the present disclosure.

In an operation S1000, the video decoding apparatus decodes the AMVR flag from the bitstream. In an embodiment, amvr_flag that is the AMVR flag indicates whether or not the adaptive spatial resolution is applied to the horizontal component and the vertical component, with respect to the difference of the motion vector of the current block.

In an operation S1002, the video decoding apparatus checks the AMVR flag.

According to the example of Table 4 of Example 2, the video decoding apparatus may determine the spatial resolution values of the horizontal component and the vertical component of the motion vector difference.

When the AMVR flag is true (Yes in the operation S1002), the video decoding apparatus performs the following operations.

In an operation S1004, the video decoding apparatus decodes the horizontal component precision index and the vertical component precision index from the bitstream. In an embodiment, amvr_flag_x that is the horizontal component AMVR flag and amvr_flag_y that is the vertical component AMVR flag indicate one of preset spatial resolution values.

In an operation S1006, the video decoding apparatus determines the spatial resolution values of the horizontal component and the vertical component on the basis of the horizontal component precision index and the vertical component precision index. The video decoding apparatus determines the spatial resolution of the horizontal component on the basis of the horizontal component precision index, and determines the spatial resolution of the vertical component on the basis of the vertical component precision index.

On the other hand, when the AMVR flag is false (No in the operation S1002), the video decoding apparatus determines, in an operation S1010, the spatial resolution of the horizontal component and the spatial resolution of the vertical component to be preset values.

The video decoding apparatus may calculate the actual value of the motion vector difference of the current block using the determined spatial resolution values of the horizontal component and the vertical component.

Although the operations in the respective flowcharts are described to be sequentially performed, the operations merely instantiate the technical idea of some embodiments of the present disclosure. Therefore, a person having ordinary skill in the art to which this disclosure pertains should readily understand that the sequences of operations described in the respective drawings may be changed and/or two or more of the operations may be performed in parallel. Hence, the operations in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure is not to be limited by the above explicitly described embodiments but by the claims and equivalents thereof.

REFERENCE NUMERALS

124: inter predictor
510: entropy decoder
544: inter predictor

What is claimed is:

1. A method of determining spatial resolution values of a first component and a second component with respect to a difference of a motion vector of a current block, performed by a video decoding apparatus, the method comprising:

decoding a same resolution flag and a first component AMVR (Adaptive Motion Vector Resolution) flag from a bitstream, wherein the same resolution flag indicates whether the spatial resolution values of the first component and the second component are the same, and wherein the first component AMVR flag indicates whether or not adaptive spatial resolution is applied to the first component;

in response to the same resolution flag being true:

determining the spatial resolution values of the first component and the second component to be a predetermined same value in response to the first component AMVR flag being false, and determining the spatial resolution values of the first component and the second component to be a same value based on a first component precision index decoded from the bitstream in response to the first component AMVR flag being true; and in response to the same resolution flag being false:

determining the spatial resolution values of the first component and the second component to be different from each other, wherein one of the first component and the second component indicates a horizontal component, and the other indicates a vertical component.

2. The method of claim 1, wherein the spatial resolution of the difference of the motion vector is the same as the spatial resolution of a motion vector predictor of the current block.

3. The method of claim 1, wherein decoding the first component AMVR flag includes:

decoding the first component precision index in response to the first component AMVR flag being true.

4. The method of claim 1, further comprising:

in response to the same resolution flag being false and the first component AMVR flag being false, deriving a second component AMVR flag to be true without decoding the second component AMVR flag, and decoding a second component precision index.

5. The method of claim 4, wherein determining the spatial resolution values of the first component and the second component to be different from each other includes:

determining the spatial resolution value of the first component to be a preset value and determining the spatial resolution value of the second component based on the second component precision index in response to the first component AMVR flag being false, and wherein the spatial resolution value of the second component is determined to be a value different from the spatial resolution value of the first component.

6. The method of claim 4, wherein determining the spatial resolution values of the first component and the second component to be different from each other includes:

determining the spatial resolution value of the second component to be a preset value and determining the spatial resolution value of the first component based on the first component precision index in response the first component AMVR flag being true and the second component AMVR flag being false, and wherein the spatial resolution value of the first component is determined to be a value different from the spatial resolution value of the second component.

7. The method of claim 4, wherein determining the spatial resolution values of the first component and the second component to be different from each other includes:

determining the spatial resolution value of the first component based on the first component precision index and determining the spatial resolution value of the second component based on the second component precision index in response the first component AMVR flag being true and the second component AMVR flag being true, and wherein the spatial resolution value of the second component is determined to be a value different from the spatial resolution value of the first component.

8. The method of claim 1, further comprising, when an AMVR flag is false, determining the spatial resolution value of the first component and the spatial resolution value of the second component to be preset values.

9. A method of encoding spatial resolution values of a first component and a second component with respect to a difference of a motion vector of a current block, performed by a video encoding apparatus, the method comprising:

determining the spatial resolution values of the first component and the second component; and encoding a same resolution flag and a first component Adaptive Motion Vector Resolution (AMVR) flag into a bitstream based on the spatial resolution values of the first component and the second component, wherein encoding the same resolution flag and the first component AMVR flag comprises:

determining that the same resolution flag is true and the first component AMVR flag is false in response to the spatial resolution values of the first component and the second component being equal to a predetermined value;

determining that the same resolution flag is true and the first component AMVR flag is true in response to the spatial resolution values of the first component and the second component being the same value that is different from the predetermined value;

encoding a first component precision index indicating the spatial resolution values of the first component and the second component in response to the spatial resolution values of the first component and the second component being the same value that is different from the predetermined value; and determining that the same resolution flag is false in response to the spatial resolution values of the first component and the second component being different, and wherein one of the first component and the second component indicates a horizontal component, and the other indicates a vertical component.

10. The method of claim 9, wherein the spatial resolution of the difference of the motion vector is the same as the spatial resolution of a motion vector predictor of the current block.

11. A method for transmitting a bitstream containing encoded video data, the method comprising:

generating the bitstream for a current block in an image; and transmitting the bitstream, wherein generating the bitstream for the image comprises:

determining spatial resolution values of a first component and a second component with respect to a difference of a motion vector of the current block, and encoding a same resolution flag and a first component AMVR Adaptive Motion Vector Resolution (AMVR) flag into the bitstream based on the spatial resolution values of the first component and the second component, wherein encoding the same resolution flag and the first component AMVR flag comprises:

determining that the same resolution flag is true and the first component AMVR flag is false in response to the spatial resolution values of the first component and the second component equal to a predetermined value, determining that the same resolution flag is true and the first component AMVR flag is true in response to the spatial resolution values of the first component and the second component being the same value that is different from the predetermined value, encoding a first component precision index indicating the spatial resolution values of the first component and the second component in response to the spatial resolution values of the first component and the second component being the same value that is different from the predetermined value, and determining that the same resolution flag is false in response to the spatial resolution values of the first component and the second component being different, and wherein one of the first component and the second component indicates a horizontal component, and the other indicates a vertical component.

* * * * *